United States Patent Office 3,666,628
Patented May 30, 1972

3,666,628
PROCESS FOR GROWING MICROORGANISMS
Robert G. Dworschack and William R. Lamm, Clinton, Iowa, assignors to Standard Brands Incorporated, New York, N.Y.
No Drawing. Continuation-in-part of application Ser. No. 705,231, Feb. 13, 1968. This application Mar. 19, 1971, Ser. No. 126,289
Int. Cl. C12d 13/10; C12b 1/20
U.S. Cl. 195—80 R                                   10 Claims

ABSTRACT OF THE DISCLOSURE

Under submerged, aerobic culture conditions, the mycelia of many microorganisms of the Streptomyces genus have a tendency to grow in the form of compact spherical masses. When small amounts of aqueous dispersible materials are present in the growth medium, the mycelia produced will be of the filamentous form. The presence of such mycelia will result in rapid growth of the microorganisms and improved enzyme production. Examples of dispersible materials are agar, carboxymethylcellulose, and diatomaceous earth.

---

This application is a continuation-in-part of patent application, Ser. No. 705,231, filed Feb. 13, 1968, now abandoned.

This invention relates to an improved process for growing microorganisms which produce glucose isomerase. In particular, the present invention relates to an improved process for growing microorganisms classified as belonging to the Streptomyces genus which produce glucose isomerase.

The major use of glucose and of corn syrups, containing glucose, is in food processing, for example in the baking, beverage, canning and confectionery industries, to provide sweetness, body or to regulate crystal growth. However, because glucose inherently lacks a high degree of sweetness and has a relatively bland flavor, its uses are somewhat limited. This is overcome, to some extent, by mixing glucose or corn syrup with sucrose or invert syrups to enhance total sweetness. This has not proven entirely satisfactory, however, because of economic and other factors involved. It has been recognized that if during the production of corn syrups, a significant proportion of the starch can be converted to fructose, a corn syrup will be provided that is sweet enough to satisfy additional purposes.

It is known in the art that glucose can be converted to fructose by heating a solution of glucose in the presence of an alkaline catalyst. The isomerized product of such a process is usually highly colored and contains substances other than fructose and glucose that are objectionable and which may impart undesirable off-flavors. Patents have been issued on processes which are directed to improving the alkaline isomerization of glucose, for instance, U.S. Patents 2,354,664 and 2,746,889, but as far as we know, none has been practiced commercially, due probably to their high cost of operation and the relatively poor quality of the product.

Various microorganisms produce enzymes which isomerize glucose to fructose. These enzymes are referred to in the art as glucose isomerase. An article appearing in Science, vol. 125, pp. 648–9 (1957) discloses that an enzyme derived from Pseudomonas hydrophila will isomerize glucose to fructose. British Patent 1,103,394 and Japanese Patent 17,640 (1966) disclose that microorganisms classified as belonging to the Streptomyces genus, such as Streptomyces flavovirens, Streptomyces archromogenes, Streptomyces echinatus, Streptomyces albus and Streptomyces phaeochromogenes produce glucose isomerase. Other microorganisms belonging to the Streptomyces genus which produce glucose isomerase are Streptomyces sp. ATCC 21175 and ATCC 21176.

It is the principal object of the present invention to provide an economic and convenient method of obtaining glucose isomerase from a microorganism of the genus Streptomyces.

It is a further object of the present invention to provide a method of obtaining improved yields of glucose isomerase from a microorganism of the genus Streptomyces, the microorganism being characterized as having the ability to assimilate xylan to produce glucose isomerase.

These objects, and others, are attained in accordance with the present invention by culture development of microorganisms selected from genus Streptomyces, which are characterized as having the ability to assimilate xylan to produce glucose isomerase, in stages in an aqueous nutrient medium under submerged, aerobic conditions, there being present in at least one of the initial growth stages a small amount of aqueous dispersible material which induces the microorganism to grow in a filamentous form, said aqueous dispersible material being characterized as not assimilated or as not completely assimilated by the microorganisms during the growth thereof.

The term "aqueous dispersible," as herein used, defines a material which is readily suspendable in an aqueous medium by mild agitation (the agitation normally required to provide aerobic conditions) or is colloidally suspendable in an aqueous medium.

Although the microorganisms used in the process of the present invention are characterized as having the ability to assimilate xylan to produce glucose isomerase, they will also assimilate other carbohydrates to produce glucose isomerase. For instance, they will assimilate xylose, glucose, and fructose in certain combinations and under certain conditions and produce glucose isomerase. Characterization of the microorganisms as having the ability to assimilate xylan to produce glucose isomerase is used only for the purposes of the present invention to differentiate these microorganisms from others which may also produce glucose isomerase, but which will not do so when the principal carbon source is a xylan.

Xylans are the most abundant polysaccharides in the hemicellulose group. They occur in practically all land plants and in some marine algae. They are most abundant in annual crops, particularly in agricultural residues such as corncobs, corn stalks, grain hulls and stems, in which they occur in amounts ranging from 15 to 30 percent by weight. Also, hardwoods contain substantial amounts of xylans, for instance in the range of 20 to 25 percent. Because xylans are readily and economically available, it is a preferred embodiment of the present invention that the principal substrate used for growing the microorganisms on a large scale be a xylan-containing material such as wheat bran.

In commercial processes for the propagation of microorganisms, it is frequently desirable to proceed by stages. These stages may be few or many, depending on the nature of the process and the characteristics of the microorganisms. Ordinarily, propagation is started by inoculating spores from a slant of a culture into a pre-sterilized nutrient medium usually contained in a shaker flask. In the flask, growth of the microorganisms is encouraged by various means, e.g., shaking for aeration and maintenance of suitable temperature. This step or stage is repeated one or more times in flasks or vessels containing the same or larger volumes of nutrient medium. These stages may be conveniently referred to as culture development stages. The microorganisms, with or without accompanying culture medium, from the last development stage, are introduced or inoculated into a large-scale fermentor to produce commercial quantities of the microorganisms or by-products therefrom.

Reasons for growing the micoorganisms in stages are numerous, but are primarily dependent upon the conditions necessary for the growth of the microorganisms and/or the production of byproducts therefrom. These include stability of the microorganisms, proper nutrients, pH, osmotic relationships, degree of aeration, temperature and the maintenance of pure culture conditions during fermentation. For instance, to obtain maximum yields of enzymes, the conditions of fermentation in the final stage may have to be changed somewhat from those practiced to obtain optimum growth of the microorganisms in the culture development stages. Maintaining the purity of the medium, also, is an extremely important consideration, especially where the fermentation is performed under aerobic conditions. If the fermentation is initially started in a large fermentor, a relatively long period of time will be needed to achieve an appreciable yield of microorganisms and/or by-products therefrom. This, of course, enhances the possibility of contamination of the medium and mutation of the microorganisms. Furthermore, the energy requirements for agitating, aeration and temperature maintenance of the medium will be large as compared to performing the fermentation in stages.

The preferred microorganisms used in the process of the present invention are Streptomyces sp. ATCC 21175 and ATCC 21176.

In the process of the present invention, a suitable amount of aqueous dispersible material is provided in one or more stages of the culture development. Exemplary of suitable dispersible materials are agar, carboxymethylcellulose and diatomaceous earth. Small amounts of these materials improve the growth of the microorganism as well as the yield of glucose isomerase obtained therefrom.

The presence of the aqueous dispersible materials during the growth of the microorganisms under submerged, aerobic culture conditions produces mycelia which are filamentous. In some cases, depending upon the type of material used, there may be present along with mycelia of the filamentous form a small proportion of mycelia in the form of compact spherical masses or pellets. When aqueous dispersible materials are not present, the mycelia produced are largely in the form of compact spherical masses or pellets. The filamentous-type growth is preferred since the mycelia are more evenly dispersed throughout the nutrient medium during fermentation, and hence are more exposed to the nutrients and oxygen. Thus, because of the filamentous-type growth, the microorganisms will grow uniformly and rapidly. Also, when an inoculum of the microorganisms having the filamentous growth characteristic is subsequently inoculated into a culture medium, rapid growth occurs as opposed to the slow growth associated with the microorganisms which are in the form of compact spherical masses or pellets.

In order that the aqueous dispersible material may induce the microorganisms to grow in filamentous form, the dispersible material must not be completely assimilated by the microorganisms during the growth thereof. If the dispersible material is completely assimilated within a certain period during the fermentation process, then, of course, it will not be present to induce the microorganisms to grow in filamentous form. Preferably, the aqueous dispersible material used is of the type which is non-assimilated by the microorganisms.

Glucose isomerase is primarily produced intracellularly by the microorganisms specifically identified above (Streptomyces sp. ATCC 21175 and Streptomyces sp. ATCC 21176). The glucose isomerase may be separated from the cells by a sonic treatment in an aqueous medium and the cells removed by filtration. The filtrate containing glucose isomerase may be used to isomerize glucose in a glucose-containing syrup. In commercial practice, however, it is economically undesirable to use such a costly procedure. In the preferred method of the present invention, the cells are removed from the fermented broth and used directly to isomerize glucose. Along with the cells, extraneous materials are also removed. Since the enzyme activity of the broth produced by the method of the present invention is unusually high, for instance in the range from 25 to 60 glucose isomerase units per milliliter of broth, lesser amounts of the cells are necessary to achieve the desired degree of isomerization than would be required if the enzyme activity of the broth were lower. Accordingly, because the extraneous materials provide ash and promote color development in the isomerized syrup, it is an advantage to produce cells which have an extremely high glucose isomerase activity.

The quantities of the aqueous dispersible materials incorporated into the fermentation medium may vary widely, for instance, in the case of agar from about 0.05 to about 0.25 percent is preferred, and about 0.2 percent is most preferred. In the case of carboxymethylcellulose, for instance, the type marketed by Hercules Powder Company under the trade name CMC 7HP, the preferred quantities are from about 0.1 to about 2.0 percent, and most preferred about 0.5 percent.

In order to more clearly describe the nature of the present invention, specific examples will hereinafter be described. It should be understood, however, that this is done solely by way of example and is intended neither to delineate the scope of the invention nor limit the ambit of the appended claims. In the examples and throughout this specification, percentages are utilized to refer to percent by weight and are based on the weight of the nutrient medium, or broth, unless otherwise specified.

In the following examples, the determination of glucose isomerase activity of the enzyme preparation is based on a modification of the method disclosed in the Japanese Journal of Agr. Biol. Chem., vol. 30, No. 12, pp. 1247–1253 (1966) by Y. Takasaki.

The modified method was performed as follows:

One ml. of a sonicated, filtered fermentation broth containing about 10 units of glucose isomerase was incubated at a pH of 7.5 and at a temperature of 70° C. in 9 ml. of an aqueous medium containing the following, per liter:

| | Moles |
|---|---|
| Glucose | 0.1 |
| $Na_2HPO_4$ | 0.05 |
| $MgSO_4 \cdot 7H_2O$ | 0.005 |

After one hour, the pH of the reaction mixture was lowered to about 3 with a 5 percent by weight perchloric acid solution in order to inactivate the glucose isomerase. One milliliter of the reaction mixture, 0.2 milliliters of a 0.2 percent cysteine hydrochloride solution, 5 milliliters of a 75 percent $H_2SO_4$ solution by volume and 0.15 milliliters of 0.12 percent carbazole in an alcoholic solution were placed in a test tube, mixed, and the test tube placed in a water bath maintained at 60° C. After 10 minutes the test tube was removed from the bath and cooled rapidly to room temperature. Light adsorption of the solution at 560 m$\mu$ was measured and the fructose content of the sample determined. One milligram of fructose equals one isomerate unit. Appropriate blanks were run to compensate for ketoses present in the enzyme preparation and those formed by alkaline isomerization.

EXAMPLE I

This example illustrates the effect of the presence of a small amount of an aqueous dispersible material in one of the culture development stages of Streptomyces sp. ATCC 21175.

Slant development

An aqueous culture medium was prepared comprising 0.4 percent xylose, 0.4 percent yeast extract, 1 percent malt extract, and 2 percent agar. The pH was adjusted to 7.3 with NaOH. This medium was sterilized by autoclaving for 20 minutes at 121° C. and made into slants. These slants were inoculated with Streptomyces sp. ATCC 21175 and incubated for 5 days at 30° C. Uniform sporulation of the microorganism occurred.

Culture development stages

Stage A.—An aqueous culture medium, adjusted to a pH of 7, was prepared, containing 1 percent xylose, 1 percent peptone, 1 percent yeast extract, 0.1 percent $MgSO_4 \cdot 7H_2O$, 0.3 percent $K_2HPO_4$, and 0.1 percent agar. The medium, except for the xylose, was sterilized by autoclaving for 30 minutes at 121° C. the xylose was sterilized prior to incorporation into the medium. A flask containing 150 ml. of the medium was inoculated with spores from the slant development stage above, the flask maintained at 30° C., and agitated for 48 hours at 180 r.p.m. in order to provide aerobic culture conditions. The mycelia obtained after the 48 hours were filamentous and free from balled-type growth. By contrast, when this fermentation was performed without the presence of the agar, balled-type growth occurred. When the balled-type growth was used in subsequent fermentations, only small amounts of glucose isomerase were produced.

Stage B.—An aqueous culture medium adjusted to a pH of 7 was prepared containing 3 percent wheat bran ground to pass through a 28 mesh U.S. Standard size screen, 1 percent peptone, 1 percent yeast extract, 0.1 percent $MgSO_4 \cdot 7H_2O$ and 0.024 percent $CoCl_2 \cdot 6H_2O$. This medium was sterilized by autoclaving for 90 minutes at 121° C. A 2-liter flask containing 800 ml. of the medium was inoculated with twenty milliliters from the culture development Stage A. The flask was maintained at 30° C., and agitated for 48 hours at 180 r.p.m. in order to provide aerobic culture conditions. The mycelia obtained after the 48 hours were filamentous and free from balled-type growth.

Final fermentation stage

An aqueous medium adjusted to a pH of 7 was prepared containing 4 percent corn steep liquor (29° Bé.), 4 percent wheat bran ground to pass through a 28 mesh U.S. Standard size screen and 0.024 percent of $CoCl_2 \cdot 6H_2O$. This medium was sterilized by autoclaving for 45 minutes at 121° C. The fermented medium of Stage B was inoculated into a stainless-steel fermentor containing 25 liters of this medium. The fermentor was provided with impellers for agitating the medium, a sterile air source and a temperature control system. The fermentor was maintained at a temperature of 30° C. and one volume of sterile air per volume of medium per minute was introduced. The fermentor was maintained under a gauge pressure of 10 p.s.i.g. After a fermentation time of 48 hours, there was obtained 43 units of glucose isomerase per ml. of fermented medium.

From the above, it is apparent that the presence of a small amount of an aqueous dispersible material greatly improves the growth of Streptomyces sp. ATCC 21175, and the subsequent yield of glucose isomerase therefrom.

EXAMPLE II

This example illustrates the effect of the presence of a small amount of various aqueous dispersible materials in two of the culture development stages of Streptomyces sp. ATCC 21175.

Culture development stages

Stage A.—An aqueous culture medium, adjusted to a pH of 7 with NaOH, was prepared containing 1 percent xylose, 1 percent peptone, 1 percent yeast extract, 0.1 percent $MgSO_4 \cdot 7H_2O$, and 0.024 percent $CoCl_2 \cdot 6H_2O$. The medium, except for the xylose, was sterilized by autoclaving for 30 minutes at 121° C. The xylose was sterilized prior to incorporation into the medium. Five 2-liter flasks each containing 800 ml. of this culture medium were inoculated with 20 ml. of the culture development Stage A of Example I. Various quantities of aqueous dispersible materials were incorporated into the flasks. After fermentation, under the conditions described in Example I, the glucose isomerase activities of the preparations were determined and the type growth observed.

Stage B.—Inocula from these fermentations were incorporated into a medium like that described immediately above, and fermented under the conditions described in Example I. The activity of the preparations were determined and the type growth observed. The results of this example are shown in the following table.

TABLE I

| Aqueous dispersible materials | Culture development, Stage A | | Culture development, Stage B | |
|---|---|---|---|---|
| | Growth | Glucose isomerase activity/ml. | Growth | Glucose isomerase activity/ml. |
| 0.2 percent agar | Filamentous | 27 | Filamentous | 29 |
| 4 percent Hyflo Supercel [1] | do | 20 | do | 23 |
| 0.5 percent carboxymethylcellulose [2] | do | 24 | do | 22 |
| 6 percent gelatinized starch | Filamentous with some compact spherical masses. | 20 | Filamentous with some spherical masses. | 11 |
| 0.8 percent Solka Floc [3] | do | 18 | Filamentous with some compact spherical masses. | 17 |
| Control (no added ingredients) | Compact spherical masses | 6 | Compact spherical masses | 9 |

[1] Manufactured by Johns-Manville (diatomaceous earth).
[2] Manufactured by Hercules Powder Co. (CMC 7HP).
[3] Manufactured by the Brown Company (a highly purified wood cellulose).

EXAMPLE III

This example illustrates the use of glucose isomerase, produced from microorganisms grown in accordance with procedures described in the preceding examples, to isomerize glucose in a glucose-containing solution to fructose.

Suitable quantities of inoculum from a culture development stage from one of the preceding examples were incorporated in a culture medium contained in a large-scale fermentor. Fermentation of the microorganisms was carried out under submerged, aerobic conditions without the presence of an aqueous dispersible material as described in the Final Fermentation Stage of Example I. The broth was filtered through a rotary vacuum drum filter precoated with Dicalite CP–150 (Great Lakes Carbon Corp.). The filter cake contained about 80 glucose isomerase units per gram.

To a glucose-containing syrup (90 D.E. and 29° Bé.) was added sufficient $MgSO_4 \cdot 7H_2O$ to obtain a molar concentration therein of 0.005 and sufficient $CoCl_2 \cdot 6H_2O$ to obtain a molar concentration therein of 0.001. The pH of this glucose-containing solution was adjusted to 6.5 and sufficient filter cake containing the glucose isomerase was added to obtain a dosage level of 15 glucose isomerase units per gram of glucose. The solution was maintained at a temperature of 70° C., and at the pH indicated above. After 72 hours, the syrup was filtered and refined. The syrup analyzed about 38 percent fructose and about 43 percent glucose, the percentage being based on the solids present.

The terms and expressions which have been employed are used as terms of description and not of limitation, and it is not intended in the use of such terms and expressions to exclude any equivalents of the features shown and described or portions thereof, since it is recognized that various modifications are possible within the scope of the invention claimed.

What is claimed is:

1. A process of culture development of microorganisms of the Streptomyces genus which are characterized by having the ability to assimilate xylan to produce glucose isomerase, comprising growing the microorganisms in stages in an aqueous nutrient medium under submerged, aerobic conditions, there being present in at least one of the initial culture stages a small amount of an aqueous dispersible material effective to induce the microorganisms to grow in a filamentous form, said aqueous dispersible material being characterized as not assimilated or as not completely assimilated by the microorganisms during the growth thereof.

2. A process of culture development of microorganisms of the Streptomyces genus as defined in claim 1, wherein there is present in the first culture stage a small amount of an aqueous dispersible material.

3. A process of culture development of microorganisms of the Streptomyces genus as defined in claim 2, wherein there is present in the first two culture stages a small amount of an aqueous dispersible material.

4. A process of culture development of microorganisms of the Streptomyces genus as defined in claim 3, wherein the microorganisms are Streptomyces sp. ATCC 21175 or Streptomyces sp. ATCC 21176.

5. A process of culture development of microorganisms of the Streptomyces genus as defined in claim 3, wherein the aqueous dispersible material is agar.

6. A process of culture development of microorganisms of the Streptomyces genus as defined in claim 5, wherein the amount of agar present in the nutrient medium is from about 0.05 percent to about 0.25 percent by weight based on the weight of the nutrient medium.

7. A process of culture development of microorganisms of the Streptomyces genus as defined in claim 6, wherein the amount of agar present in the nutrient medium is about 0.2 percent by weight based on the weight of the nutrient medium.

8. A process of culture development of microorganisms of the Streptomyces genus as defined in claim 3, wherein the aqueous dispersible material is carboxymethylcellulose.

9. A process of culture development of microorganisms of the Streptomyces genus as defined in claim 8, wherein the amount of carboxymethylcellulose present in the nutrient medium is from about 0.1 to about 2.0 percent by weight based on the weight of the nutrient medium.

10. A process of culture development of microorganisms of the Streptomyces genus as defined in claim 4, wherein the aqueous dispersible material is diatomaceous earth and the amount present is about 4 percent by weight based on the weight of the nutrient medium.

References Cited

UNITED STATES PATENTS 3,616,221   10/1971   Takasaki et al. _____ 195—31

OTHER REFERENCES

Tsumura et al.: Agr. Biol. Chem., vol. 29, No. 12.

LIONEL M. SHAPIRO, Primary Examiner

U.S. Cl. X.R.

195—31 R, 66 R

UNITED STATES PATENT OFFICE
CERTIFICATE OF CORRECTION

Patent No. 3,666,628  Dated May 30, 1972

Inventor(s) Robert G. Dworschack and William R. Lamm

It is certified that error appears in the above-identified patent and that said Letters Patent are hereby corrected as shown below:

Column 2, line 2, change "archromogenes" to --achromogenes--.
Column 5, line 23, change "fiilamentous" to --filamentous--.
Column 5, line 32, after "0.1 percent" add -- $MgSO_4 \cdot 7H_2O$ --.
Column 5, line 48, delete "$MgSO_4 \cdot 7H_2O$".

Signed and sealed this 12th day of June 1973.

(SEAL)
Attest:

EDWARD M. FLETCHER, JR.          ROBERT GOTTSCHALK
Attesting Officer                 Commissioner of Patents